United States Patent [19]
Suni

[11] Patent Number: 5,802,025
[45] Date of Patent: Sep. 1, 1998

[54] TRACK DETECTION METHODS AND APPARATUS FOR SIMULTANEOUS MONITORING OF MULTIPLE ADJACENT TRACKS OF AN OPTICAL DISK

[75] Inventor: Paul Suni, Los Gatos, Calif.

[73] Assignee: Zen Research N.V., Curacao, Netherlands Antilles

[21] Appl. No.: 921,459

[22] Filed: Aug. 15, 1997

Related U.S. Application Data

[63] Continuation of Ser. No. 559,778, Nov. 15, 1995, abandoned.

[51] Int. Cl.$^6$ ............................................ G11B 7/095
[52] U.S. Cl. ..................... 369/44.41; 369/111; 369/120; 369/124
[58] Field of Search .................. 369/44.23, 44.25, 369/44.26, 44.29, 44.35, 44.41, 44.42, 54, 58, 97, 111, 112, 124, 120

[56] References Cited

U.S. PATENT DOCUMENTS

| | | | |
|---|---|---|---|
| 4,460,988 | 7/1984 | Gordon | 369/32 |
| 4,486,870 | 12/1984 | Pettigrew et al. | 369/32 |
| 4,536,866 | 8/1985 | Jerome et al. | 369/112 |
| 4,571,638 | 2/1986 | Schneider et al. | |
| 4,628,356 | 12/1986 | Spillman et al. | |
| 4,646,280 | 2/1987 | Toyosawa | 369/50 |
| 4,839,876 | 6/1989 | Fennema | 369/32 |
| 4,845,552 | 7/1989 | Jaggi et al. | |
| 4,918,676 | 4/1990 | Miyasaka | 369/32 |
| 4,972,396 | 11/1990 | Rafner | 369/32 |
| 4,980,876 | 12/1990 | Abate et al. | 369/44.11 |
| 4,989,190 | 1/1991 | Kuroe et al. | 369/32 |
| 5,001,732 | 3/1991 | Nomura et al. | |
| 5,053,626 | 10/1991 | Tillotson | |
| 5,081,617 | 1/1992 | Gelbart | 369/112 |
| 5,111,445 | 5/1992 | Psaltis et al. | 369/103 |
| 5,128,919 | 7/1992 | Narahara et al. | 369/97 |
| 5,150,347 | 9/1992 | Yanagi | 369/44.37 |
| 5,155,718 | 10/1992 | Hashimoto et al. | 369/44.35 X |
| 5,199,017 | 3/1993 | Kagami et al. | 369/44.28 |
| 5,210,726 | 5/1993 | Jackson et al. | 369/32 |
| 5,233,583 | 8/1993 | Reno | 369/44.26 |
| 5,239,530 | 8/1993 | Seo et al. | 369/54 |
| 5,245,597 | 9/1993 | Lee et al. | 369/44.28 |
| 5,274,507 | 12/1993 | Lee | 360/39 |
| 5,283,776 | 2/1994 | Takagi et al. | 369/58 |
| 5,295,125 | 3/1994 | Oonishi et al. | 369/44.29 |
| 5,301,174 | 4/1994 | Matoba et al. | 369/44.28 |
| 5,313,448 | 5/1994 | Sukeda et al. | 369/121 |
| 5,361,245 | 11/1994 | Yoshida et al. | 369/44.28 |
| 5,371,358 | 12/1994 | Chang et al. | |
| 5,394,386 | 2/1995 | Park et al. | 369/44.28 |
| 5,426,623 | 6/1995 | Alon et al. | 369/32 |
| 5,596,200 | 1/1997 | Sharma et al. | |

*Primary Examiner*—W. R. Young
*Attorney, Agent, or Firm*—Fish & Neave; Nicola A. Pisano

[57] ABSTRACT

Track detection methods and apparatus for simultaneous electronic monitoring of the locations of multiple adjacent data tracks is provided. A dedicated tracking detector enables both a longer integration time for developing a tracking signal and decreased processing requirements for developing useful tracking information.

20 Claims, 3 Drawing Sheets

TRACK DETECTION METHODS AND APPARATUS FOR SIMULTANEOUS MONITORING OF MULTIPLE ADJACENT TRACKS OF AN OPTICAL DISK

This is a continuation of application Ser. No. 08/559,778, filed Nov. 15, 1995, now abandoned.

FIELD OF THE INVENTION

This invention relates to methods and apparatus for retrieving information from an optical disk by simultaneously reading multiple adjacent data tracks, and more particularly to the simultaneous electronic monitoring of the locations of multiple adjacent data tracks.

BACKGROUND OF THE INVENTION

Optical disks have become widely used in part due to their relatively high storage capacity. Whereas a 3 ½ inch floppy disk can store 1.44 Mb (megabytes) of data, a 12 centimeter compact (optical) disk can store upwards of 650 Mb. Optical disks have therefore become increasingly popular in recent years, with a number of products becoming commercially available in a compact-disk (CD), optical disk format. More recent developments include the use of CD format for data storage for personal computer systems, which may be either read-only CD-ROMs or recordable CDs.

A CD-ROM generally includes a 1.2 mm transparent plastic substrate having data encoded in pits that are impressed into the substrate along spiral or concentric data tracks on a 1.6 micron pitch. The pitted substrate is coated with a reflective layer.

To retrieve information from an optical disk, the disk is rotated and light is directed through the transparent substrate onto the reflective layer. The inhomogeneity created in the reflective surface by the pits causes light reflected from the pitted reflective surface to be of lower intensity, while the non-pitted reflective surface between the pits reflects almost all of the incident light. It is this modulation in light intensity that is used for information storage and retrieval.

Light reflected from the optical disk is directed to image detectors comprised of photosensitive elements that develop electronic signals corresponding to the intensity of the reflected light. These electronic signals are decoded by processing circuitry that recovers the digital information stored in the data tracks of the optical disk. Further details regarding the construction and use of optical disks can be found in *Compact Disc Technology*, Nakajima, H. and Ogawa, H., translated by Aschmann, C., published by Ohmsha, Ltd., Japan (1992), and *The Compact Disc Handbook*, Pohlmann, K., 2d. ed., A-R Editions, 1992.

Because data is encoded sequentially along the data tracks of an optical disk, optical disk reading apparatus must be able to follow a particular track in order to be able to read the data encoded thereon. One of the problems encountered in reading data from an optical disk is that the data tracks typically exhibit eccentricity, which may cause the distance between a data track and the disk center to vary by as much as 70 microns. To read information from an optical disk, the apparatus must be able to accommodate this eccentricity during the retrieval of information.

In previously known optical disk readers, the image detector is mounted on an optical pickup which reads from one data track at a time. The optical pickup typically includes lenses for focusing the light from the light source to particular portions of the disk surface, and for reflecting light from the reflective disk surface to the image detector, as described, for example, in the aforementioned *Compact Disc Technology* text at Chapters 6 and 7, which are incorporated herein by reference.

In such previously known systems, tracking is generally accomplished using the well-known "twin spot" method, as described, for example, at pp. 133–136 of the above-incorporated text. In this method, secondary beams from the light source are projected onto the optical disk ahead of and behind the main illumination beam, and slightly off-axis from the main illumination beam. Thus, tracking detectors associated with the secondary beams "see" only the non-pitted reflective surface of the optical disk when the main illumination beam is centered over the data track. An error signal is then developed as the difference between the signals generated by the tracking detectors. That error signal is provided to a servo-motor controlling movement of the pickup.

The increased availability of CD-ROM products, coupled with the availability of increasingly faster microprocessors, has created the need for ever faster optical disk drives. As a result, disk drives capable of operating at multiples of a standard single speed drive are becoming available, for example, 2×, 4× and even 6× drives. For a 6×(six times single speed) disk drive, the disk is rotated at speeds up to 2400 rpm when reading the innermost data track.

The ability to achieve even greater speeds may soon be limited by the ability of such technology to continue to provide low-cost, easily manufacturable systems, since the use of greater disk rotational speeds will require more sophisticated, higher tolerance, and thus more expensive, designs than employed in previously known arrangements.

An alternative to simply increasing the disk rotational speed is to read multiple data tracks simultaneously, as described in commonly assigned U.S. Pat. No. 5,426,623, the entirety of which is incorporated herein by reference. In accordance with the methods and apparatus provided therein, for example, ten adjacent data tracks may be read simultaneously. Thus, even if the disk is rotated at only twice standard speed (i.e., a 2× drive is used), the capability to read multiple tracks provides the equivalent of a 20× drive—more than a factor of three faster than previously known disk drives.

Implementation of simultaneous multiple track reading capability for optical disks presents new problems, however, relating to tasks such as focussing and tracking. The tracking system described in the above-incorporated patent analyzes the signal developed by the image detector to determine tracking information, and shifts the data stored in memory to account for radial movements of the tracks.

While the tracking system described in the above-incorporated patent is effective, it nevertheless requires additional processing of the signals developed by the image detector to separate out a tracking component from the digital data component. Also, because the tracking signal is developed from the signal generated by the image detector, there is no capability to correct the tracking until the path of the image detector has already begun to stray.

In view of the foregoing, it would be desirable to provide tracking methods and apparatus, for use with apparatus capable of simultaneously reading multiple data tracks, that directly generates a tracking signal, without additional processing of the image detector output.

It further would be desirable to provide tracking methods and apparatus, for use with apparatus capable of simultaneously reading multiple data tracks, that generates a tracking signal independently of the signal generated by the image detector.

It would be yet further desirable to provide tracking methods and apparatus, for use with apparatus capable of simultaneously reading multiple data tracks, that generates a tracking signal that permits more rapid evaluation and correction of the path followed by the image detector.

SUMMARY OF THE INVENTION

In view of the foregoing, it is an object of this invention to provide tracking methods and apparatus, for use with apparatus capable of simultaneously reading multiple data tracks, that directly generates a tracking signal, without additional processing of the image detector output.

It is a further object of the present invention to provide tracking methods and apparatus, for use with apparatus capable of simultaneously reading multiple data tracks, that generates a tracking signal independently of the signal generated by the image detector.

It is another object of this invention to provide tracking methods and apparatus, for use with apparatus capable of simultaneously reading multiple data tracks, that generates a tracking signal that permits more rapid evaluation and correction of the path followed by the image detector.

These and other objects of the invention are accomplished in accordance with the principles of the invention by providing tracking methods and apparatus, for use with apparatus capable of simultaneously reading multiple data tracks, that includes a dedicated tracking detector.

In a preferred embodiment, the dedicated tracking detector comprises charge-coupled device elements having an integration time for developing a tracking detector signal that is approximately two orders of magnitude greater than the integration time for the image detector. The tracking detector of the present invention directly generates a signal that, with little additional processing, provides an error signal for rapid correction of the path traversed by the image detector.

Further features of the invention, its nature and various advantages will be more apparent from the accompanying drawings and the following detailed description of the preferred embodiments.

DETAILED DESCRIPTION OF THE INVENTION

Figure 1:
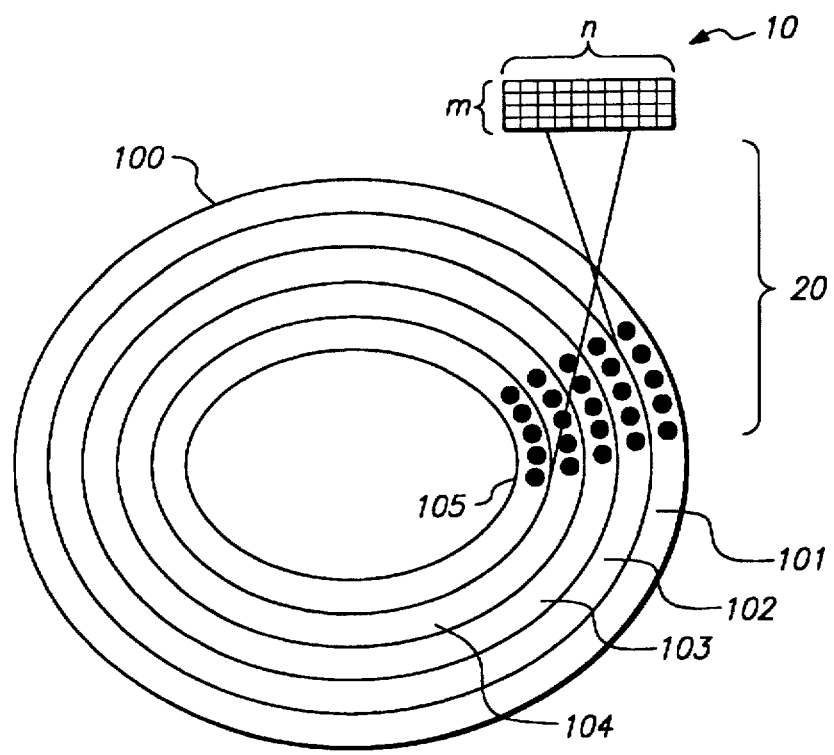
FIG. 1 is an illustrative view of an image detector matrix simultaneously reading data from multiple adjacent data tracks.
Figure 2:
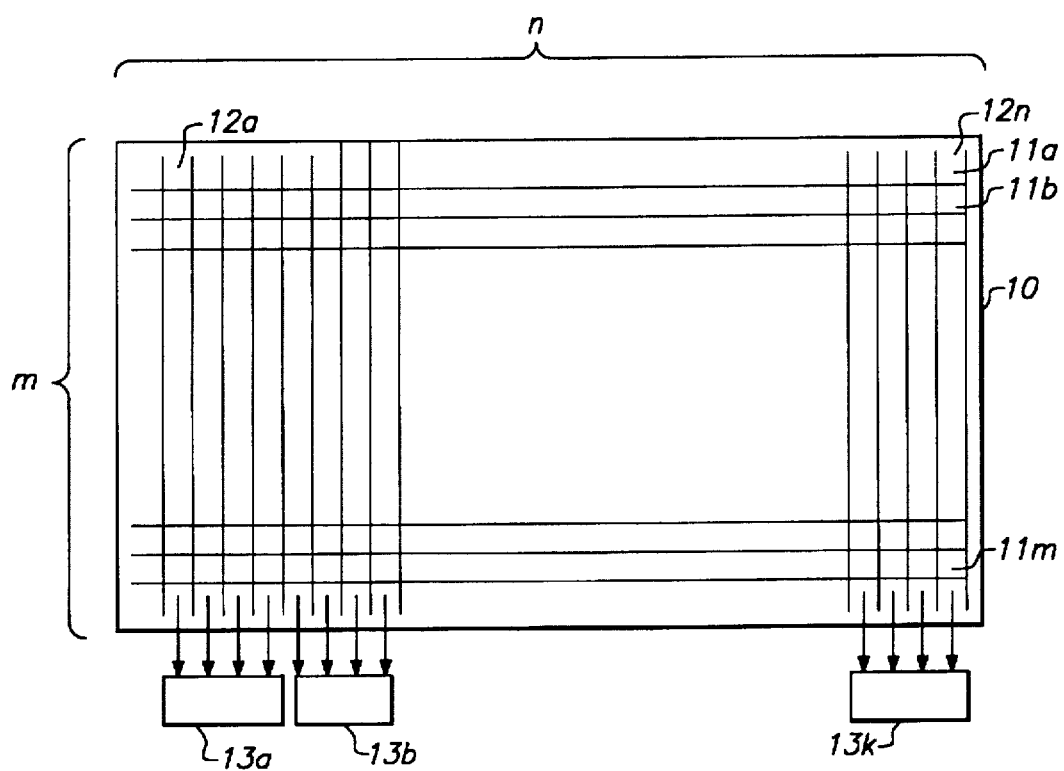
FIG. 2 is a detailed view of an image detector of FIG. 1.

Referring to FIGS. 1 and 2, an image detector capable of simultaneously reading multiple data tracks as described in commonly assigned U.S. Pat. No. 5,426,623, which is incorporated herein by reference in its entirety, and suitable for use with the present invention, is described. Alternatively, the present invention may be substituted for the track position locator circuitry of the simultaneous multiple-track reading apparatus described in commonly owned, concurrently filed U.S. patent application Ser. No. 08/559,429, now U.S. Pat. No. 5,627,805.

Detector matrix 10 is positioned to read data from an optical disk 100, and is made up of a plurality of photosensitive elements arranged in a pattern of m rows x n columns. Light rays 20 reflected from plurality of tracks 101, 102, 103 and 104, impinge upon detector matrix 10 via a suitable arrangement of objectives, beam splitters and mirrors, as described in the above-incorporated patent.

Detector matrix 10, which is preferably a time-delay-integration (TDI) detector, is used both to develop signals representative of data contained on the optical disk and to develop signals used to monitor the location of multiple adjacent data tracks, i.e., for tracking. Detector matrix 10 includes m rows (11a through 11m), and n columns (12a through 12n) of photosensitive elements, herein referred to as "pixels."

When light reflected from a pit on optical disk 100, for example, pit 105 in FIG. 1, impinges upon column 11a, a signal is developed at each pixel row 11a–11m. As optical disk 100 then rotates, the signals generated in each of pixels 11a–11m in column 11a is shifted backward to the next pixel row and summed. This process continues until the light signal reaches the last pixel row, row 11m, at which point the signal is shifted out to an associated switch matrix, 13a through 13k. The signals output by the detector matrix are then provided to processing circuitry (not shown) that processes the signals to recover the digital data stored in the multiple tracks, as well as to develop information about which columns of pixels correspond to certain data tracks.

Figure 3:
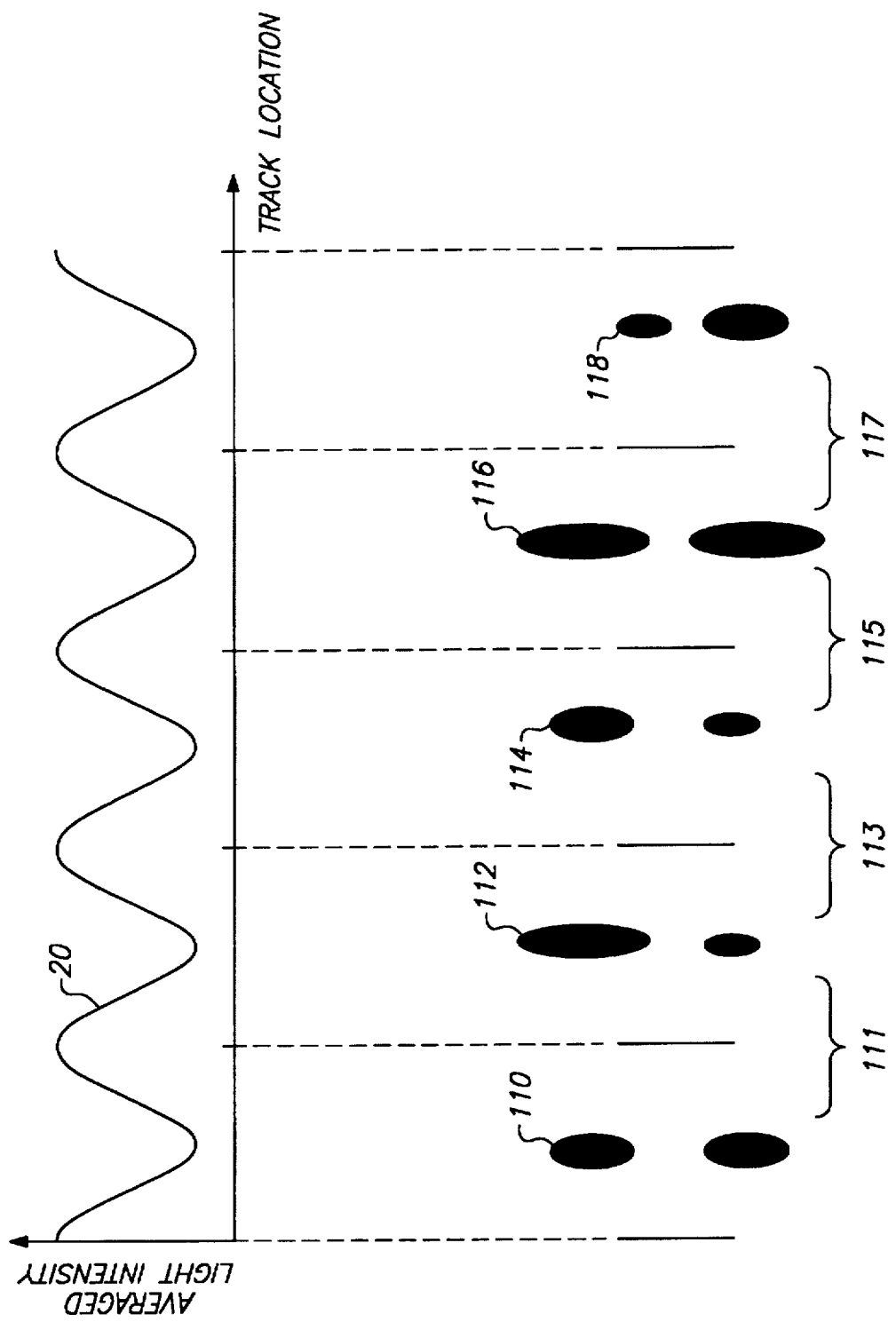
FIG. 3 shows the modulation in average light intensity for information bearing portions of a track and for the non-information bearing areas between tracks.

Referring to FIG. 3, processing of the signal data generated by the detector matrix of FIGS. 1 and 2 is described. In FIG. 3, modulation of the time-averaged light intensity of light reflected from the optical disk is shown corresponding to the locations of the information-bearing tracks on the optical disk 100. As explained hereinabove, the light reflected from information-bearing pits 110, 112, 114, 116 and 118, is less than that reflected from the smooth reflective area between tracks, indicated as regions 111, 113, 115 and 117. Thus, the signal output by detector matrix 10, after suitable processing as described in the above-incorporated patent, exhibits minima and maxima, as illustrated by waveform 20 of FIG. 3.

By storing data relating to the positions of the maxima and minima of the intensity of the reflected light detected by detector matrix 10, the track locations can be electronically monitored. In order to use detector 10 for tracking, as well as data detection, the signal output by detector matrix 10 is be processed to smooth modulations corresponding to the presence of the information-bearing pits in optical disk 100.

Figure 4:
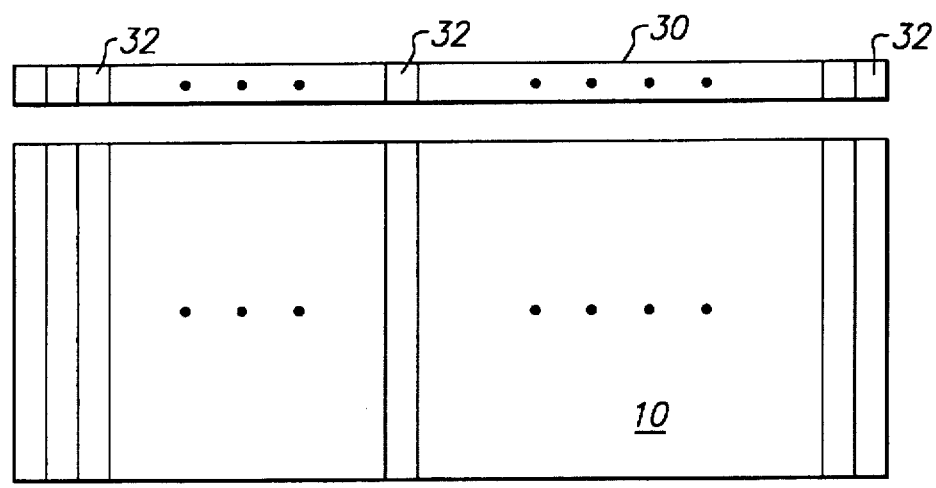
FIG. 4 shows a image detector matrix and a tracking detector constructed in accordance with a preferred embodiment of the present invention.

Referring now to FIG. 4, tracking detector 30 in accordance with the present invention is described that improves upon the tracking system provided in the above-incorporated patent. Tracking detector 30 comprises a dedicated CCD device that is used to develop signals representative of the data tracks. Tracking detector 30 is preferably located adjacent to detector matrix 10, which is now used for data detection only.

Tracking detector 30 comprises charge-coupled device (CCD) photosensitive elements 32, also referred to as "pixels." When used as a photosensitive element, a CCD forms a charge packet proportional to the intensity of impinging light. The operation of CCDs is well known and is explained in more detail, for example, at pp. 355–361 of *Solid State Electronic Devices*, Streetman, 2d ed., which is incorporated herein by reference. Of course, as will be appreciated by those of skill in the design of optical disk readers, other kinds of photosensitive elements may be used in accordance with the principles of this invention.

Each pixel 32 develops a signal that is used to electronically monitor the position of multiple adjacent data tracks. The width of tracking detector may be selected depending upon the maximum degree of eccentricity of the data tracks on the optical disk for which electronic compensation is desired and the number of multiple adjacent tracks to be monitored. Alternatively, the width of tracking detector may be selected based on both electronic tracking and mechanical movement of the tracking detector. In a preferred embodiment, the width of an element 32 of tracking detector 30 is about one-half to one-fourth as wide as the data track, or about 0.4 to 0.1 microns (as imaged on the disk). In this preferred embodiment, tracking detector 30 is 64 pixels wide by 1 pixel deep.

Figure 5:
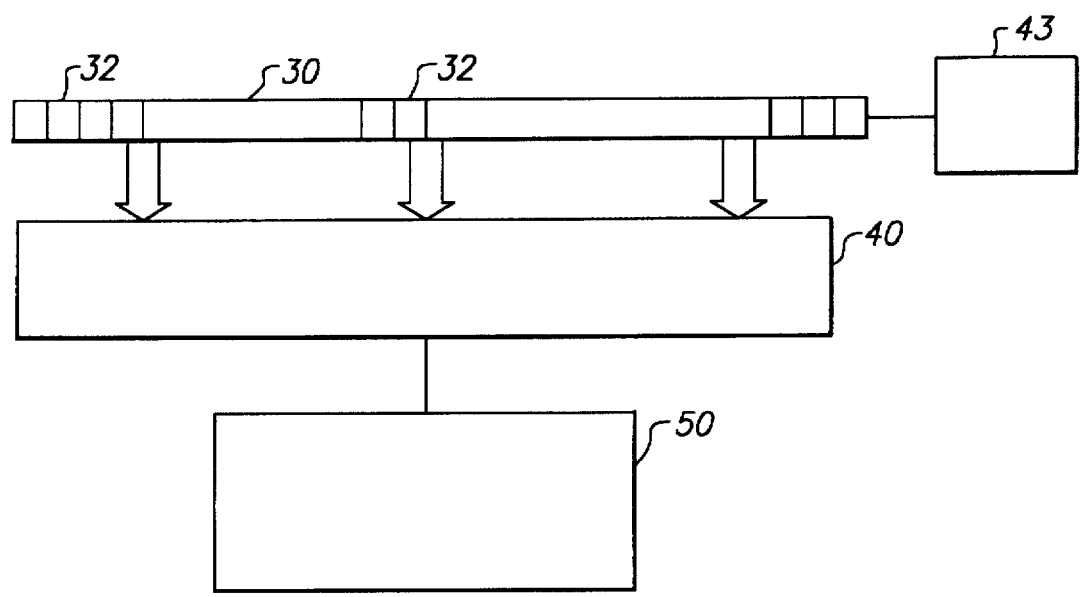
FIG. 5 is a block diagram of an electronic circuit suitable for implementing a tracking system in accordance with the embodiment of FIG. 4.

Referring now to FIG. 5, illustrative circuitry for processing the signals generated by tracking detector 30 is described. Tracking detector 30 is coupled to shift register 40, control logic 43, and processing circuitry 50. Tracking detector 30 has an integration period associated with the operation of its CCD elements.

In accordance with the methods of the present invention, tracking detector 30 has an integration period that is several orders of magnitude slower than detector matrix 10, so as to be less responsive to the presence or absence of image-bearing pits in the reflective surface of the optical disk. In this manner, the summed signal is not affected by differences in the modulated light signal due to the data, but rather is determined by the average intensity of light reflected from a data track or the space between data tracks.

The charges developed on elements 32 effectively integrate the light impinging upon the pixels to generate an average value that can be readily processed, for example, by differentiation, to produce a waveform having maxima and minima indicating where the track boundaries are located. Control logic 43 may be used to adjust the integration period, for example, by changing the rate at which clock pulses are applied to sense the charge accumulated on tracking detector 30.

In a preferred embodiment of the invention, tracking detector 30 has an integration period that is selected between about two microseconds and one millisecond. The lower bound on the integration time is about 20 times the integration period for the image detector, while the upper bound is selected to reduce disruption due to mechanical movement. The integration period for tracking detector 30 is therefore preferably between 20 and 100 times slower than the data sampling rate.

The circuitry of FIG. 5 operates as follows. An integration period is first selected for tracking detector 30 and provided by control logic 43. At the end of the integration period, a signal representative of the accumulated charge in a pixel (which in turn corresponds to the light impinging upon the pixel during the integration period) is shifted out to shift register 40, and tracking detector 30 again begins accumulating charge for a next integration period. From shift register 40, the signal is provided to processing circuitry 50.

Processing circuitry 50 provides differentiation and oversampling to identify the minima and maxima within the tracking signals to develop electronic representations of the track centers, as discussed above in connection with FIG. 3. The tracking signals are then used, for example, in the pixel select circuitry described in commonly owned and concurrently filed U.S. patent application Ser. No. 08/559,429, now U.S. Pat. No. 5,627,805 to select the data acquired by the image detector (i.e., detector matrix 10) corresponding to the track locations of interest. In this manner, tracking detector 30 accounts for radial movement of the data tracks on optical disk 100.

While a preferred illustrative embodiment of the present invention is described above, it will be obvious to one skilled in the art that various changes and modifications may be made therein without departing from the invention and it is intended in the appended claims to cover all such changes and modifications which fall within the true spirit and scope of the invention.

What is claimed is:

1. A method of tracking multiple data tracks in apparatus for simultaneously reading multiple data tracks of an optical disk, the apparatus including a light source providing illumination that covers the multiple data tracks and an image detector for generating signals corresponding to data stored in the multiple data tracks, the method comprising:

providing a tracking detector comprising a plurality of photosensitive elements dedicated to monitoring locations of the multiple data tracks;

positioning the tracking detector at a position to the image detector so that light reflected from the multiple data tracks impinges upon the tracking detector, the intensity of the light impinging upon each of the plurality of photosensitive elements being dependent on the data stored in the multiple data tracks;

accumulating charge on each of the plurality of photosensitive elements of the tracking detector responsive to the light impinging upon the photosensitive elements, the charge being accumulated for an interval of time, wherein the intensity of the light impinging upon the photosensitive elements is modulated corresponding to the data stored in the multiple data tracks;

reading, at the end of the interval, the charge accumulated on the plurality of photosensitive elements; and processing the charge read from the plurality of photosensitive elements to develop a tracking signal corresponding to the locations of each of the multiple data tracks.

2. The method as defined in claim 1 wherein the apparatus further comprises circuitry for storing and processing the signals generated by the image detector, the method further comprising processing the signals generated by the image detector to account for radial movement of the locations of the multiple data tracks.

3. The method as defined in claim 1 wherein the image detector generates signals corresponding to data stored in the multiple data tracks at a first rate, the method further comprising selecting the time interval so that the accumulated charge is read at a second rate between 20 and 100 times slower than the first rate.

4. A method for electronically monitoring locations of multiple adjacent tracks of an optical disk using apparatus for retrieving information from an optical disk, the apparatus including an image detector for generating image signals corresponding to data encoded in the multiple adjacent tracks, the method comprising steps of:

rotating an optical disk;

causing light to be reflected off of a surface of the optical disk, the light being modulated in accordance with information contained in multiple adjacent data tracks residing on the surface;

receiving the light reflected off of multiple adjacent data tracks with a dedicated tracking detector located adjacent to the image detector, the tracking detector comprising a plurality of photosensitive elements, the plurality of photosensitive elements developing an electronic signal representing the reflected light incident thereon;

integrating the electronic signal over an integration period; and processing the integrated electronic signal to develop a tracking signal representing the location of each of the multiple adjacent data tracks.

5. The method of claim 4 wherein the apparatus further comprises circuitry for storing and processing the image signals, the method further comprising processing the image signals, responsive to the tracking signal, to account for radial movement of the locations of each of the multiple data tracks.

6. The method as defined in claim 5 wherein the integration period determines a rate at which the integrated signals are provided, and wherein the rate at which the image detector generates the image signals is between 20 and 100 times faster than the rate at which the integrated signals are provided.

7. In apparatus for simultaneously reading multiple data tracks of an optical disk, the apparatus including a light source providing illumination that covers the multiple data tracks and an image detector for generating image signals corresponding to data stored in the multiple data tracks, the improvement comprising:

a plurality of photosensitive elements dedicated to monitoring locations of the multiple data tracks;

means for causing a light signal having an intensity corresponding to the data stored in the multiple data tracks to be projected upon the plurality of photosensitive elements, each one of the plurality of photosensitive elements accumulating a charge during a predetermined interval of time, the charge being proportional to the intensity of that portion of the light signal incident thereon and the length of the predetermined interval;

means for providing signals responsive to the charge accumulated on the photosensitive elements during the predetermined interval; and means for processing the signals to develop a tracking signal corresponding to the locations of each of the multiple data tracks.

8. Apparatus as defined in claim 7 wherein the plurality of photosensitive elements comprises a single row of photosensitive elements.

9. Apparatus as defined in claim 7 wherein each one of the plurality of photosensitive elements has a width that covers between one-fourth and one-half of one of the multiple data tracks.

10. Apparatus as defined in claim 7 wherein the plurality of photosensitive elements comprises charge-coupled devices.

11. Apparatus as defined in claim 7 wherein the tracking signal comprises information about how each track corresponds to specified ones of the plurality of photosensitive elements.

12. Apparatus as defined in claim 7 wherein the charge is accumulated on each one of the plurality of photosensitive elements for a period between 2 microseconds and 1 millisecond.

13. Apparatus as defined in claim 7 wherein the charge is accumulated on each one of the plurality of photosensitive elements for a first period of time, the image detector generates signals corresponding to data stored in the multiple data tracks during a second period of time, and the first period of time is longer than the second period of time.

14. Apparatus for representing locations of multiple adjacent data tracks of an optical disk comprising:

optical means for providing an image of a portion of multiple adjacent data tracks of the optical disk;

a track detector comprising a plurality of photosensitive elements onto which the image of the portion of multiple adjacent data tracks is projected, the track detector separate from an image detector used to develop signals representing data encoded on the optical disk, each one of the plurality of photosensitive elements developing an electronic signal corresponding to an intensity of a portion of the projected image striking the photosensitive element during a first interval of time;

means for processing the electronic signals stored in the plurality of photosensitive elements to develop a tracking signal corresponding to the locations of each of the multiple adjacent data tracks.

15. Apparatus as defined in claim 14 wherein the plurality of photosensitive elements comprises a single row of photosensitive elements.

16. Apparatus as defined in claim 14 wherein each one of the plurality of photosensitive elements has a width that covers between one-fourth and one-half of one of the multiple data tracks.

17. Apparatus as defined in claim 14 wherein the plurality of photosensitive elements comprises charge-coupled devices.

18. Apparatus as defined in claim 14 wherein the tracking signal comprises information about how each track corresponds to specified ones of the plurality of photosensitive elements.

19. Apparatus as defined in claim 14 wherein the electronic signal is incremented for a period between 2 microseconds and 1 millisecond.

20. Apparatus as defined in claim 14 wherein the image detector develops signals representing data encoded on the optical disk during a second interval of time, and the first interval of time is longer than the second interval of time.

* * * * *